United States Patent
Yamauchi et al.

(10) Patent No.: US 9,507,645 B2
(45) Date of Patent: Nov. 29, 2016

(54) THREAD PROCESSING METHOD FOR USING A MULTI-CORE PROCESSOR AND SYSTEMS THEREFOR

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 526 days.

(21) Appl. No.: 14/057,281

(22) Filed: Oct. 18, 2013

(65) Prior Publication Data
US 2014/0053163 A1   Feb. 20, 2014

Related U.S. Application Data

(63) Continuation of application No. PCT/JP2011/059570, filed on Apr. 18, 2011.

(51) Int. Cl.
G06F 9/46 (2006.01)
G06F 12/00 (2006.01)
(Continued)

(52) U.S. Cl.
CPC ............ *G06F 9/52* (2013.01); *G06F 9/3851* (2013.01); *G06F 9/5027* (2013.01); *G06F 11/1687* (2013.01); *G06F 11/1695* (2013.01); *G06F 12/0811* (2013.01); *G06F 12/0842* (2013.01)

(58) Field of Classification Search
None
See application file for complete search history.

(56) References Cited

U.S. PATENT DOCUMENTS

| 5,787,488 A * | 7/1998 | Garde ............... G06F 13/4217 |
| | | 711/127 |
| 7,496,918 B1 * | 2/2009 | Dice .................... G06F 9/524 |
| | | 709/225 |
| 2007/0283358 A1 | 12/2007 | Kasahara |

(Continued)

FOREIGN PATENT DOCUMENTS

| EP | 1 865 417 A2 | 12/2007 |
| JP | 63-307529 | 12/1988 |

(Continued)

OTHER PUBLICATIONS

English language International Preliminary Report on Patentability for PCT/JP2011/059570, mailed Oct. 31, 2013, 16 pages.

(Continued)

*Primary Examiner* — Tammy Lee
(74) *Attorney, Agent, or Firm* — Staas & Halsey LLP

(57) ABSTRACT

A thread processing method that is executed by a multi-core processor, includes supplying a command to execute a first thread to a first processor; judging a dependence relationship between the first thread and a second thread to be executed by a second processor; comparing a first threshold and a frequency of access of any one among shared memory and shared cache memory by the first thread; and changing a phase of a first operation clock of the first processor when the access frequency is greater than the first threshold and upon judging that no dependence relationship exists.

13 Claims, 14 Drawing Sheets

(51) Int. Cl.
*G06F 9/52* (2006.01)
*G06F 9/50* (2006.01)
*G06F 9/38* (2006.01)
G06F 12/08 (2016.01)
G06F 11/16 (2006.01)

(56) References Cited

U.S. PATENT DOCUMENTS

2008/0282012 A1\* 11/2008 Ishimi .................. G06F 1/3293
710/306
2009/0164826 A1    6/2009 Kottke
2010/0257538 A1\* 10/2010 Zhao ..................... G06F 9/4881
718/106

FOREIGN PATENT DOCUMENTS

| JP | 1-142940   | 6/1989  |
| JP | 2003-108389 | 4/2003  |
| JP | 2007-328415 | 12/2007 |
| JP | 2008-518311 | 5/2008  |

OTHER PUBLICATIONS

International Search Report mailed Jul. 19, 2011 in corresponding International Application No. PCT/JP2011/059570.
Extended European Search Report dated Nov. 24, 2014 in corresponding European Patent Application No. 11864094.5.

\* cited by examiner

FIG.4

APPLICATION TABLE ~400

| APP | THREAD | DEPENDENT THREAD | ACCESS FREQUENCY | LOAD | |
|---|---|---|---|---|---|
| APP #1 | THREAD #1 | THREAD #2 | 100000 [TIMES/s] | 50 [%] | ~401-1 |
| | | THREAD #3 | | | |
| APP #1 | THREAD #2 | THREAD #3 | 90000 [TIMES/s] | 80 [%] | ~401-2 |
| APP #1 | THREAD #3 | THREAD #1 | 80000 [TIMES/s] | 40 [%] | ~401-3 |
| APP #2 | THREAD #1 | - | 17000 [TIMES/s] | 40 [%] | ~401-4 |
| ⋮ | ⋮ | ⋮ | ⋮ | ⋮ | ⋮ |

FIG.5

ASSIGNMENT TABLE ~500

| APP | THREAD | ASSIGNED CPU | |
|---|---|---|---|
| APP #1 | THREAD #1 | 201-1 | ~501-1 |
| APP #1 | THREAD #2 | 201-1 | ~501-2 |
| ... | ... | 201-2 | ~501-3 |
| ... | ... | 201-3 | ~501-4 |
| ... | ... | 201-4 | ~501-5 |

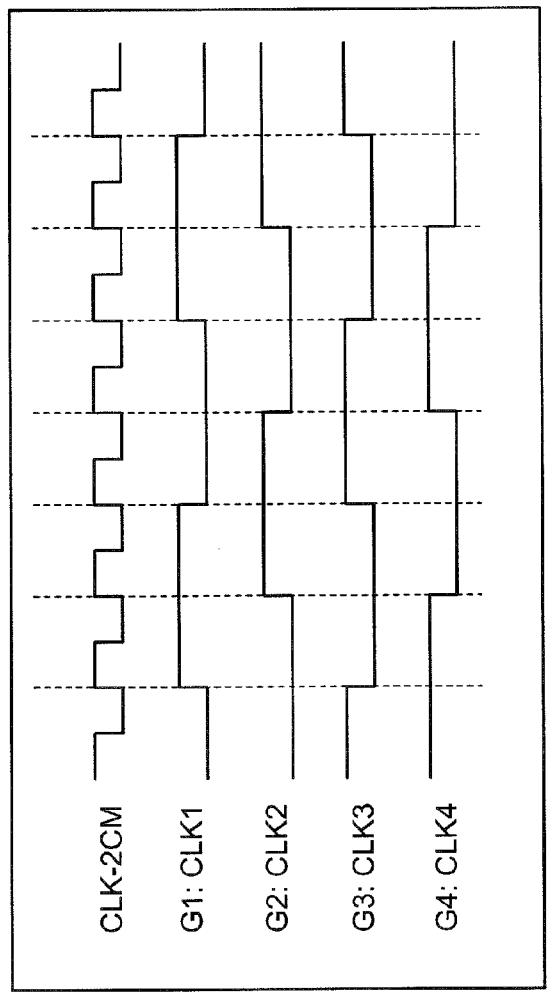
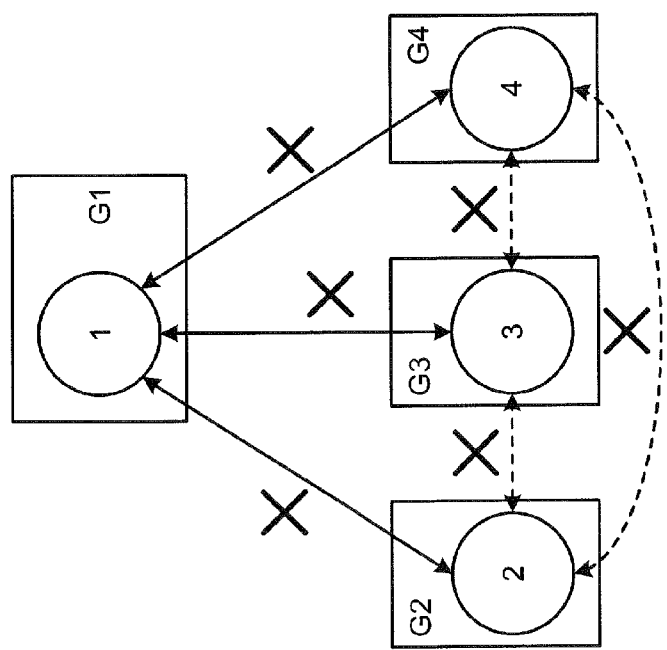
FIG.7

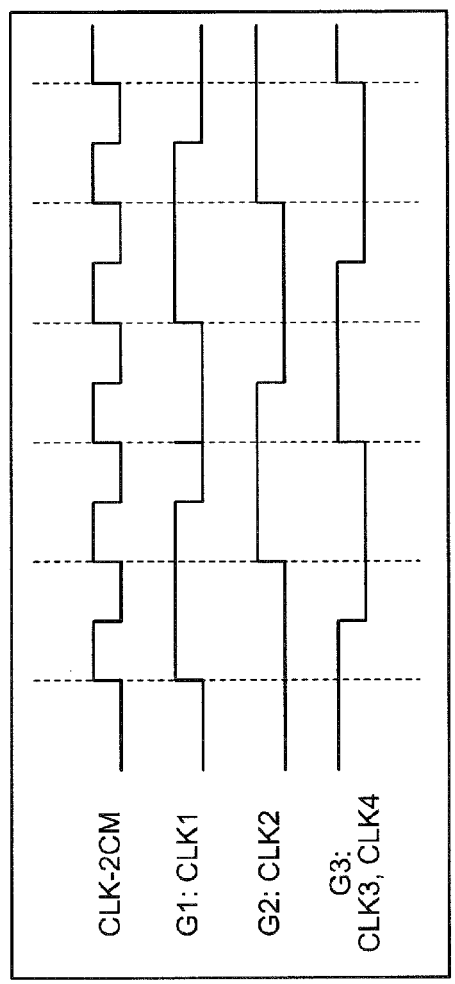
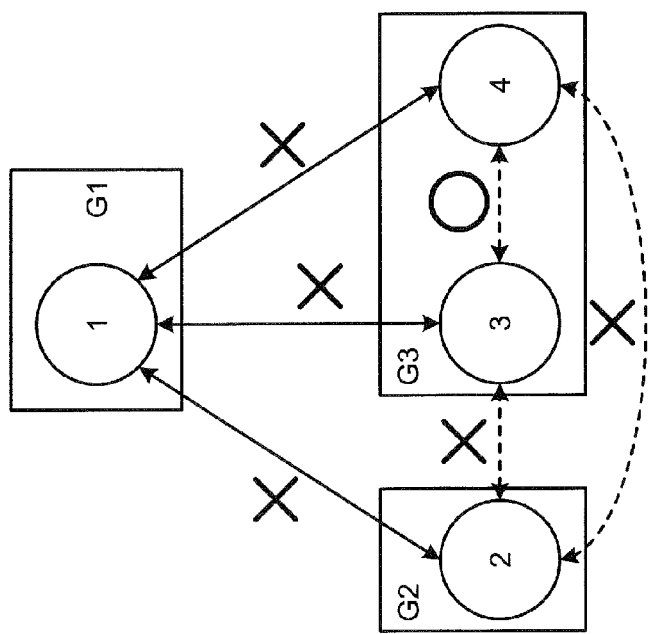
FIG.8

FIG.9
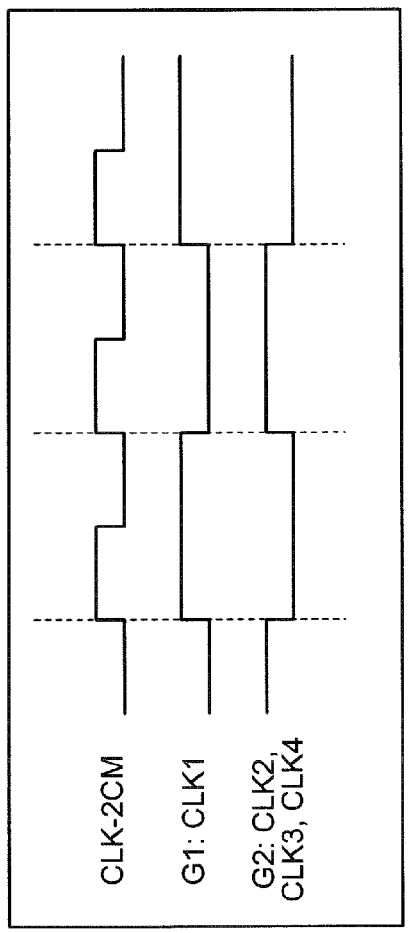
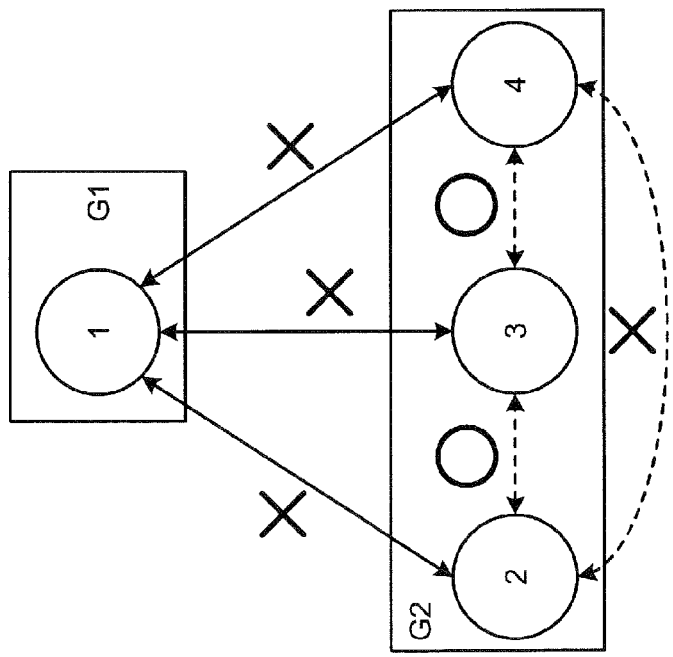

FIG.10
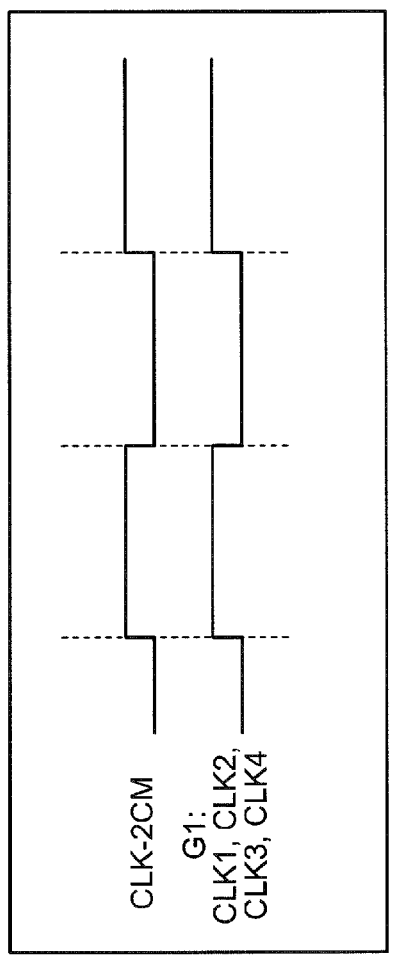
CLK-2CM
G1:
CLK1, CLK2,
CLK3, CLK4
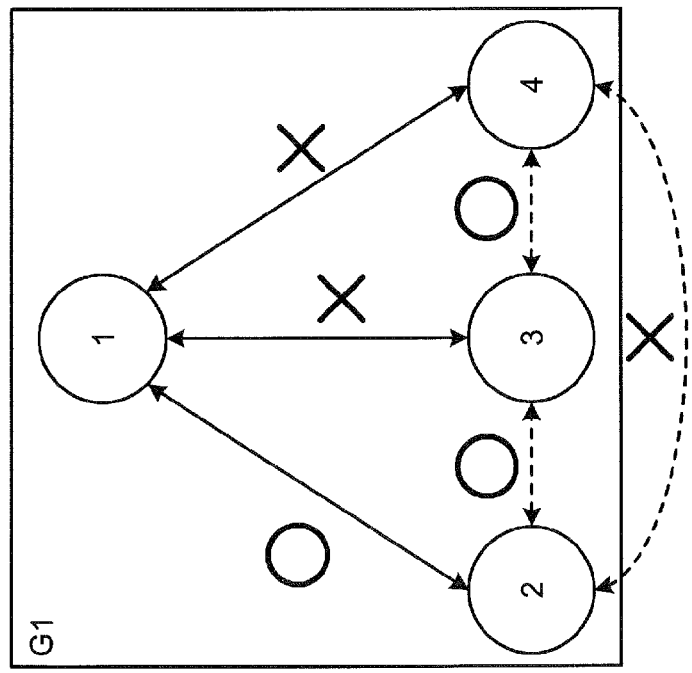

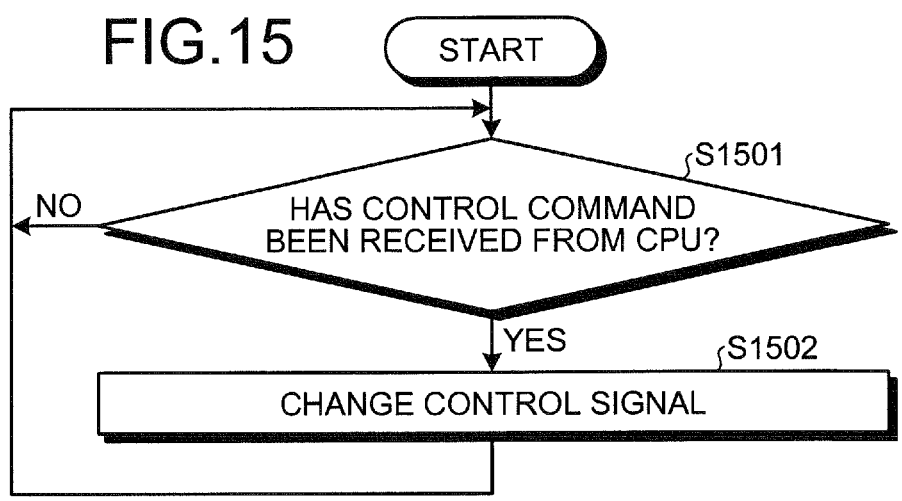

THREAD PROCESSING METHOD FOR USING A MULTI-CORE PROCESSOR AND SYSTEMS THEREFOR

CROSS REFERENCE TO RELATED APPLICATIONS

This application is a continuation application of International Application PCT/JP2011/059570, filed on Apr. 18, 2011 and designating the U.S., the entire contents of which are incorporated herein by reference.

FIELD

The embodiments discussed herein are related to a thread processing method and a thread processing system.

BACKGROUND

In a multi-core processor system, plural CPUs run plural threads. Shared resources, such as memory and a bus, shared by the plural CPUs may be accessed concurrently by plural CPUs. Since the shared resources, for example, cannot perform processes related to plural accesses simultaneously, the shared resources judge the priority of each access and perform the processes related to the accesses in the order of priority.

A technology is known of causing in a fault-tolerant system, all CPUs to perform the same operation in a failure mode. Namely, when plural CPUs contend for access of shared resources, the plural CPUs access the same data of the shared resources. Then, to permit a master CPU to access the shared resources, to not permit a slave CPU to access the shared resources, and to return results of the access by the master CPU to the slave CPU, where a clock of a phase opposite to that of the clock to be supplied to the master CPU is supplied to the slave CPU. A technology is known of delaying the timing of the access of the shared resources by the slave CPU compared to the timing of the access by the mater CPU (see, e.g., Published Japanese-Translation of PCT Application, Publication No. 2008-518311).

The conventional technologies, however, have a problem in that when two accesses of the shared resources happen at the same time in a mode other than the failure mode, the processing related to one of the accesses is caused to wait.

SUMMARY

According to an aspect of an embodiment, a thread processing method that is executed by a multi-core processor, includes supplying a command to execute a first thread to a first processor; judging a dependence relationship between the first thread and a second thread to be executed by a second processor; comparing a first threshold and a frequency of access of any one among shared memory and shared cache memory by the first thread; and changing a phase of a first operation clock of the first processor when the access frequency is greater than the first threshold and upon judging that no dependence relationship exists.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram of an example of an application table;

FIG. 5 is an explanatory diagram of an example of an assignment table;

FIG. 7 is an explanatory diagram of example 1;

FIG. 8 is an explanatory diagram of example 2;

FIG. 9 is an explanatory diagram of example 3;

FIG. 10 is an explanatory diagram of example 4;

FIG. 15 is a flowchart of an example of a changing process by the clock generating circuit 204.

DESCRIPTION OF EMBODIMENTS

An embodiment of a thread processing method and a thread processing system will be described in detail with reference to the accompanying drawings. In the embodiment, a multi-core processor system is used as an example of the thread processing system. In the multi-core processor system, a multi-core processor is a processor equipped with plural cores. So long as plural cores are provided, the processor may be a single processor to which the plural cores are equipped or may be a group of single-core processors in parallel. In the embodiment, for simplification of description, description will be made using a group of single-core processors in parallel as an example.

Figure 1:
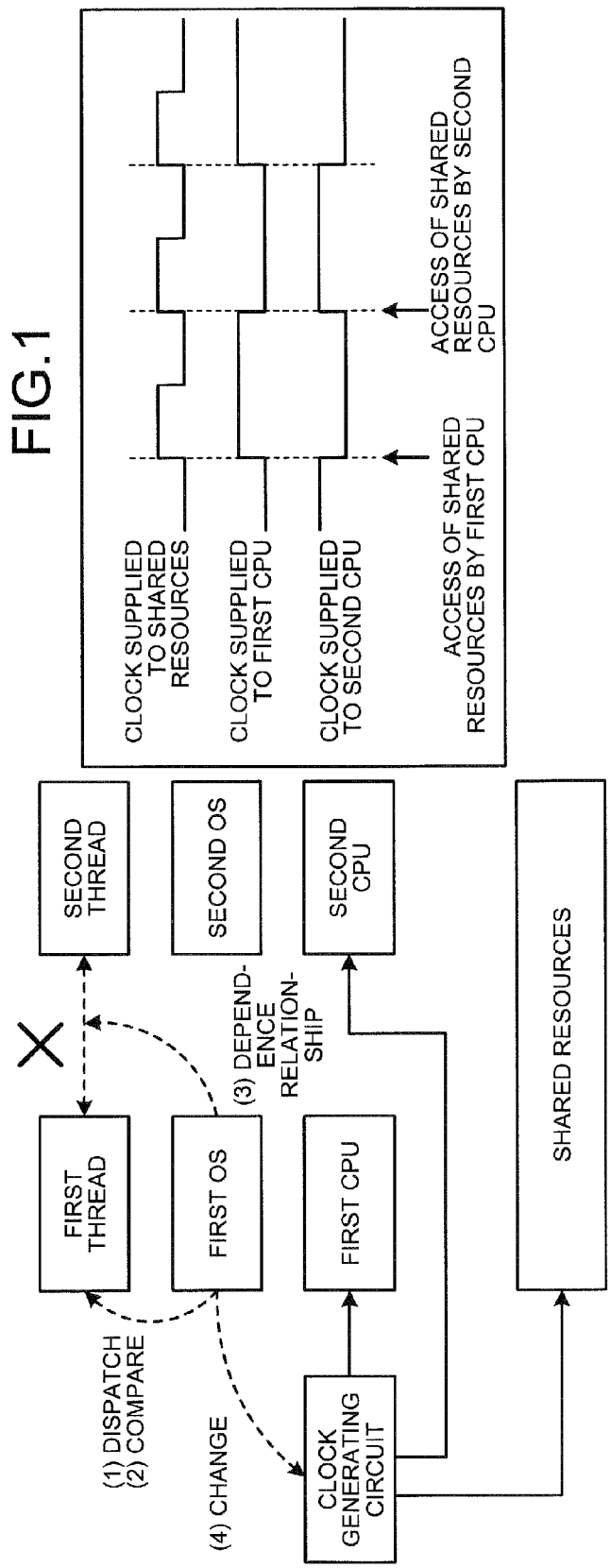
FIG. 1 is an explanatory diagram of one example of an embodiment.

FIG. 1 is an explanatory diagram of one example of the embodiment. A first OS (1) dispatches a first thread to a first CPU. The first OS (2) compares the frequency of access of shared resources by the first thread and a first threshold. For example, shared memory, shared cache memory, a bus, etc., are example of shared resources. The first OS (3) judges a dependence relationship between the first thread and a second thread under execution by a second CPU. An application program is executed in units of threads. An example of having a dependence relationship is a case where the first and the second threads share data. For example, it is assumed that at the time of designing the application, a designer preliminarily analyzes whether to have cache coherency among the CPUs.

If it is judged that the access frequency is greater than the first threshold and that there is no dependence relationship (indicated by x), the first OS (4) changes setting of a clock generating circuit so that the phase of the clock to be supplied to the first CPU and the phase of the clock to be supplied to the second CPU are inverses of each other. The first OS (4) changes the setting of the clock generating circuit so that the frequency of the clock to be supplied to the shared resources will be twice as great as the frequency of the clock to be supplied to the first CPU.

For example, assuming that processing related to the first CPU, the second CPU, and the shared resources is performed at the rising edge of the clock, there will be no access collision at the shared resources by the first CPU and the second CPU.

Figure 2:
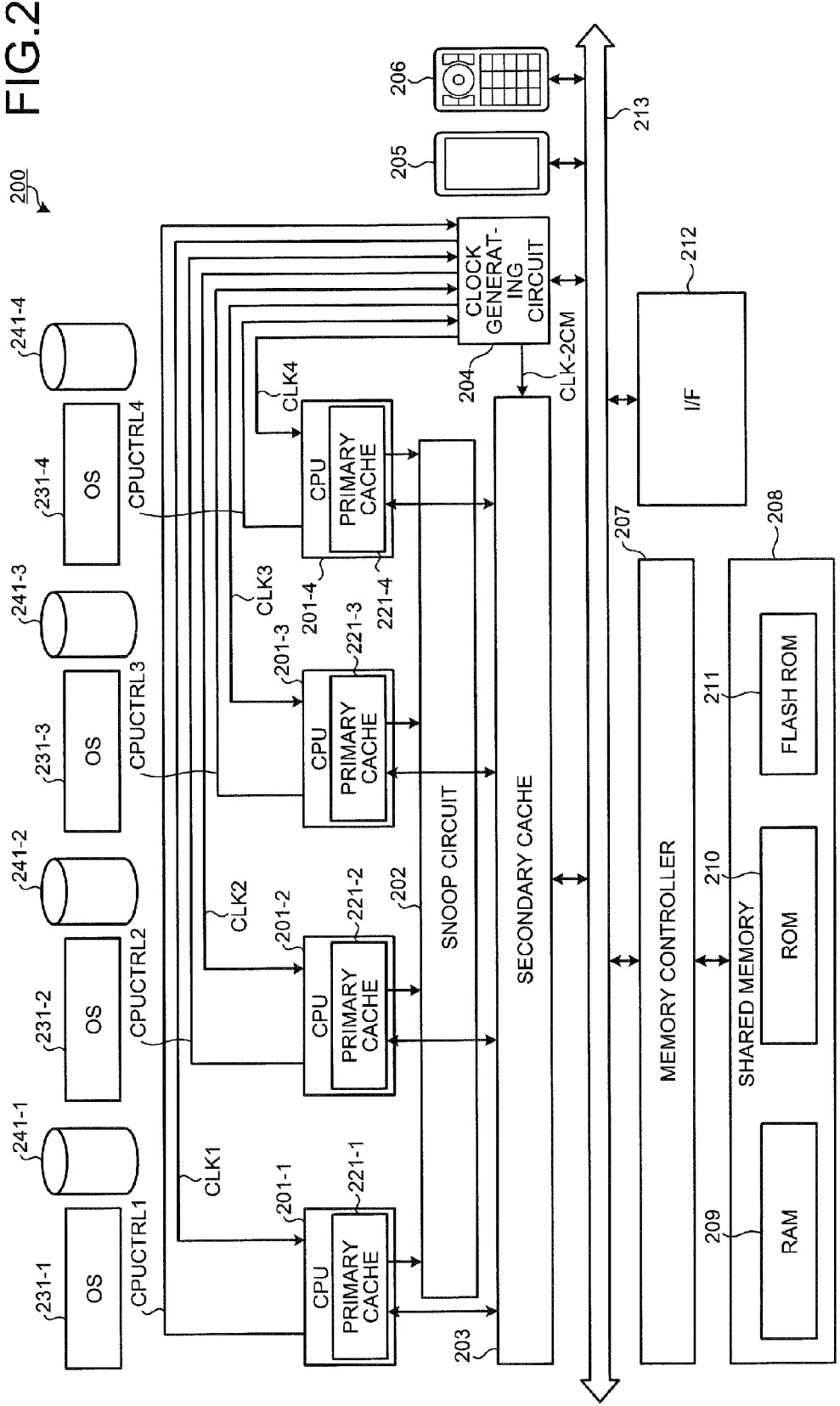
FIG. 2 is a block diagram of an example of a multi-core processor system.

FIG. 2 is a block diagram of an example of the multi-core processor system. A multi-core processor system 200 has CPUs 201-1 to 201-N (N=4 is given as an example), a snoop circuit 202, a secondary cache 203, and a clock generating circuit 204. The multi-core processor system 200 further has a display 205, a keyboard 206, an interface (I/F) 212, a memory controller 207, and a shared memory 208.

The secondary cache 203, the clock generating circuit 204, the display 205, the keyboard 206, the I/F 212, and the memory controller 207 are connected by way of a bus 213. The CPUs 201-1 to 201-4 are connected to each of the units by way of the secondary cache 203. The shared memory 208 is connected to each of the units by way of the memory controller 207.

The CPUs 201-1 to 201-4 have registers, cores, and primary caches 221-1 to 221-4, respectively. The core has an arithmetic function. The register in each CPU has a program counter (PC) and a reset register.

The CPU 201-1 is a master CPU, is in charge of overall control of the multi-core processor system 200, and executes an OS 231-1. The OS 231-1 is a master OS and executes threads assigned to the CPU 201-1. The OS 231-1 has a scheduler and the scheduler has a function of controlling to which CPU 201 in the multi-core processor, an application is to be assigned for which a starting instruction has been received. The scheduler has a function of controlling the execution order of the applications assigned to the CPU 201-1.

The CPUs 201-2 to 201-4 are slave CPUs and execute OSs 231-2 to 231-4, respectively. The OSs 231-2 to 231-4 are slave OSs and execute threads assigned to the CPUs 201-2 to 201-4, respectively. The OSs 231-2 to 231-4 have schedulers, which have a function of controlling the execution order of the applications assigned to the CPUs 201-2 to 201-4, respectively.

The OSs 231-1 to 231-4 have run queues 241-1 to 241-4, respectively and the run queues 241-1 to 241-4 have stacks of pointers of context information of the applications assigned to the CPUs 201-1 to 201-4, respectively. The context information is, for example, information that includes the execution state of a loaded application and variables in the application. The OSs 231-1 to 231-4, by acquiring the pointers of the context information in the run queues 241-1 to 241-4, respectively, to access the context information of the applications, can immediately execute the applications.

The primary caches 221-1 to 221-4 have cache memory and cache controllers, respectively. The primary caches 221-1 to 221-4 temporarily store data written to the shared memory 208 by the threads under execution by the OSs 231-1 to 231-4, respectively. The primary caches 221-1 to 221-4 temporarily store data read out from the shared memory 208.

When the data shared by the primary caches 221-1 to 221-4 is updated at any one primary cache 221, the snoop circuit 202 detects the updating and updates other primary caches 221 as well.

The secondary cache 203 has cache memory and a cache controller. The secondary cache 203 stores data pushed from the primary caches 221-1 221-4. The secondary cache 203 stores data shared by the OSs 231-1 to 231-4. The secondary cache 203 has a larger storage capacity and is a slower access speed by the CPUs 201-1 to 201-4 than the primary caches 221-1 to 221-4. The secondary cache 203 has a smaller storage capacity and a faster access speed by the CPUs 201-1 to 201-4 than the shared memory 208.

The display 205 displays, for example, data such as text, images, functional information, etc., in addition to a cursor, icons, and/or tool boxes. A thin-film-transistor (TFT) liquid crystal display and the like may be employed as the display 205. The keyboard 206 includes, for example, keys for inputting letters, numerals, and various instructions and performs the input of data. Alternatively, a touch-panel-type input pad or numeric keypad, etc. may be adopted.

The I/F 212 is connected to a network 111 such as a local area network (LAN), a wide area network (WAN), and the Internet through a communication line and is connected to other apparatuses through the network 111. The I/F 212 administers an internal interface with the network 111 and controls the input and output of data with respect to external apparatuses. For example, a modem or a LAN adaptor may be employed as the I/F 212.

The memory controller 207 controls access of the shared memory 208. The shared memory 208 includes, for example, random access memory (RAM) 209, read only memory (ROM) 210, and flash ROM 211. The ROM 210 stores programs such as a boot program. The RAM 209 is used as a work area of each CPU. The flash ROM 211 stores system software such as OSs 231-1 to 231-4 and application programs. The RAM 209 has a slower access speed by each CPU than the flash ROM 211. By an OS loading an application program from the flash ROM 211 onto the RAM 209, the context information of the application is deployed within the RAM 209.

The clock generating circuit 204 supplies the clock to each unit. A clock CLK is a reference clock to be input from an oscillating circuit or from an external source. Clocks CLK1 to CLK4 are clocks to be supplied to the CPUs 201-1 to 201-4, respectively. A clock CLK-2CM is a clock to be supplied to the secondary cache 203. Although the memory controller 207, the shared memory 208, the bus 213, the I/F 212, the display 205, the keyboard 206, etc., are also supplied with the clocks from the clock generating circuit 204, paths thereof are omitted from the drawing.

The phase of the clock to be supplied to each CPU and the frequency of the clock to be supplied to the secondary cache 203 are determined, for example, according to a control signal CPUCTRL1, a control signal CPUCTRL2, a control signal CPUCTRL3, and a control signal CPUCTRL4.

Figure 3:
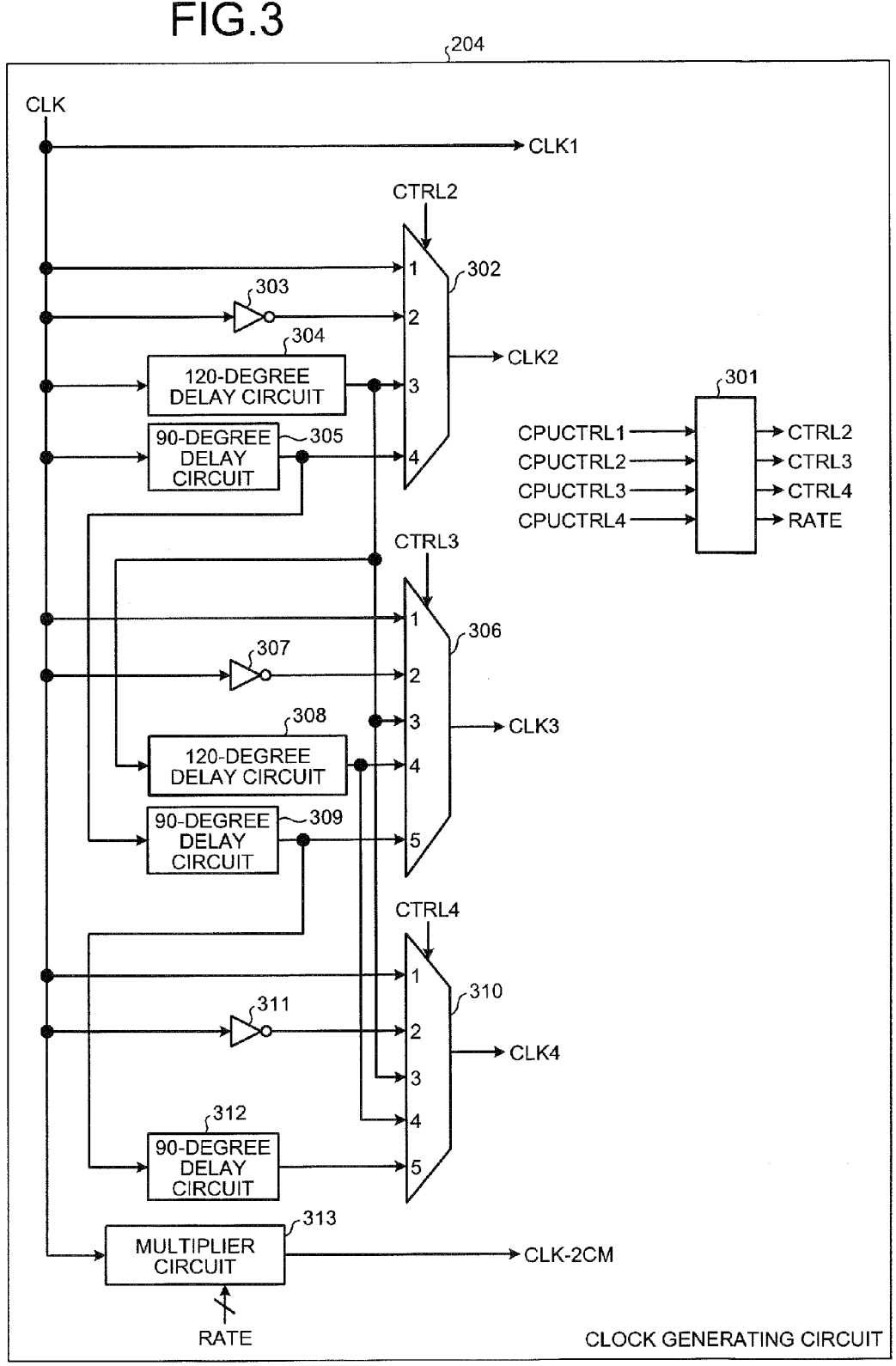
FIG. 3 depicts an example of a clock generating circuit 204.

FIG. 3 depicts an example of the clock generating circuit 204. The clock generating circuit 204 has a control determining circuit 301, a selecting circuit 302, an inverter 303, a 120-degree delay circuit 304, a 90-degree delay circuit 305, a selecting circuit 306, an inverter 307, and a 120-degree delay circuit 308. The clock generating circuit 204 has a 90-degree delay circuit 309, a selecting circuit 310, an inverter 311, a 90-degree delay circuit 312, and a multiplier circuit 313.

The inverter 303, by inverting and outputting the clock CLK, outputs a clock of a phase opposite to that of the clock CLK. The inverter 307, by inverting and outputting the clock CLK, outputs a clock of a phase opposite to that of the clock CLK. The inverter 311, by inverting and outputting the clock CLK, outputs a clock of a phase opposite to that of the clock CLK.

The 120-degree delay circuit 304 shifts the phase of the clock CLK by 120-degrees. The 120-degree delay circuit 308 shifts the phase of the clock to be output from the 120-degree delay circuit 304 by 120 degrees. The 90-degree delay circuit 305 shifts the phase of the clock CLK by 90 degrees. The 90-degree delay circuit 309 shifts the phase of the clock to be output from the 90-degree delay circuit 305 by 90 degrees. The 90-degree delay circuit 312 shifts the phase of the clock to be output from the 90-degree delay circuit 309 by 90 degrees.

The selecting circuit 302 selects the clock to be supplied to the CPU 201-2, according to the value of a control signal CTRL2. If the control signal CTRL2 is "1", then the selecting circuit 302 selects the clock CLK. If the control signal CTRL2 is "2", then the selecting circuit 302 selects the clock of the phase opposite to that of the clock CLK. If the control signal CTRL2 is "3", then the selecting circuit 302 selects the clock obtained by shifting the phase of the clock CLK by 120 degrees. If the control signal CTRL2 is "4", then the selecting circuit 302 selects the clock obtained by shifting the phase of the clock CLK by 90 degrees.

The selecting circuit 306 selects the clock to be supplied to the CPU 201-3, according to the value of a control signal CTRL3. If the control signal CTRL3 is "1", then the selecting circuit 306 selects the clock CLK. If the control signal CTRL3 is "2", then the selecting circuit 306 selects the clock of the phase opposite to that of the clock CLK. If the control signal CTRL3 is "3", then the selecting circuit 306 selects the clock obtained by shifting the phase of the clock CLK by 120 degrees. If the control signal CTRL3 is "4", then the selecting circuit 306 selects the clock obtained by shifting the phase of the clock CLK by 240 degrees. If the control signal CTRL3 is "5", then the selecting circuit 306 selects the clock obtained by shifting the phase of the clock CLK by 180 degrees.

The selecting circuit 310 selects the clock to be supplied to the CPU 201-4, according to the value of a control signal CTRL4. If the control signal CTRL4 is "1", then the selecting circuit 310 selects the clock CLK. If the control signal CTRL4 is "2", then the selecting circuit 310 selects the clock of the phase opposite to that of the clock CLK. If the control signal CTRL4 is "3", then the selecting circuit 310 selects the clock obtained by shifting the phase of the clock CLK by 120 degrees. If the control signal CTRL4 is "4", then the selecting circuit 310 selects the clock obtained by shifting the phase of the clock CLK by 240 degrees. If the control signal CTRL4 is "5", then the selecting circuit 310 selects the clock obtained by shifting the phase of the clock CLK by 270 degrees.

The multiplier circuit 313 multiplies the clock CLK according to RATE. If a control signal RATE is "1", then the multiplier circuit 313 directly outputs the clock CLK. If the control signal RATE is "2", then the multiplier circuit 313 outputs a clock of a frequency twice as high as that of the clock CLK. If the control signal RATE is "3", then the multiplier circuit 313 outputs a clock of a frequency three times as high as that of the clock CLK. If the control signal RATE is "4", then the multiplier circuit 313 outputs a clock of a frequency four times as high as that of the clock CLK. The maximum value of the control signal RATE is "4".

The control determining circuit 301 determines the phase of the clock to be supplied to each CPU and the frequency of the clock to be supplied to the secondary cache 203, according to the control signals CPUCTRL1 to CPUCTRL4. For example, the bit width of each of the control signals CPUCTRL1 to CPUCTRL4 is 12 bits (3 [bit]×4 [control signal]). It is assumed that in each of the control signals CPUCTRL1 to CPUCTRL4, each upper 3 bits denote the value of the control signal CTRL2, the value of the control signal CTRL3, the value of the control signal CTRL4, and the value of the control signal RATE in that order.

For example, the OS 231-1 sets the control signal CPUCTRL1 at "0000 (decimal notation)" during normal operation and changes the control signal CPUCTRL1 at the time of changing the phase of the clock to be supplied to each CPU or the frequency of the clock to be supplied to the secondary cache 203. For example, it is assumed that when the value of the control signal CPUCTRL1 is changed to "1234 (decimal notation)", the control determining circuit 301 determines the value of the control signal CTRL2 as "1" and the value of the control signal CTRL3 as "2". Further, it is assumed that the control determining circuit 301 determines the value of the control signal CTRL4 as "3" and the value of the control signal RATE as "4". It is assumed that the control determining circuit 301 detects the change of the control signals CPUTRL1 to CPUTRL4 from "0000" to a changed value but does not detect the change from the changed value to "0000".

FIG. 4 is an explanatory diagram of an example of an application table. An application table 400 has the fields of app ID, thread ID, dependent thread ID, access frequency, and load.

In the app ID field, identification information to identify each application is registered. In the thread ID field, identification information to identify each thread is registered. In the dependent thread ID field, identification information of the thread having a dependence relationship with the thread whose identification information is registered in the thread ID field of the same record is registered.

In the access frequency field, the number of accesses of the secondary cache 203 per unit time by the thread whose identification information is registered in the thread ID field of the same record is registered. In the load field, the ratio of the execution time per unit time of the thread whose identification information is registered in the thread ID field of the same record is registered. The access frequency and the load are registered based on results of analysis and simulation at the time of compilation of each thread.

By setting information in the fields, app information (e.g., app information 401-1 to 401-4) is stored as a record. The application table 400 is stored in a memory device such as the RAM 209, the ROM 210, and the flash ROM 211. Further, a duplicate application table 400 may be stored in the secondary cache 203, the primary cache 221, etc.

FIG. 5 is an explanatory diagram of an example of an assignment table. An assignment table 500 has the fields of app ID, thread ID, and assigned-CPU ID. In the app ID field, identification information to identify each application is registered. In the thread ID field, identification information to identify each thread is registered. In the assigned-CPU ID field, identification information of the CPU to which the thread is assigned whose identification information is registered in the thread ID field of the same record is registered.

With the information set in each field, assignment information (e.g., assignment information 501-1 to 501-5) is stored as a record. The assignment table 500 is stored in the memory device such as the RAM 209, the ROM 210, and the flash ROM 211. Further, a duplicate assignment table 500 may be stored in the secondary cache 203, the primary cache 221, etc.

Figure 6:
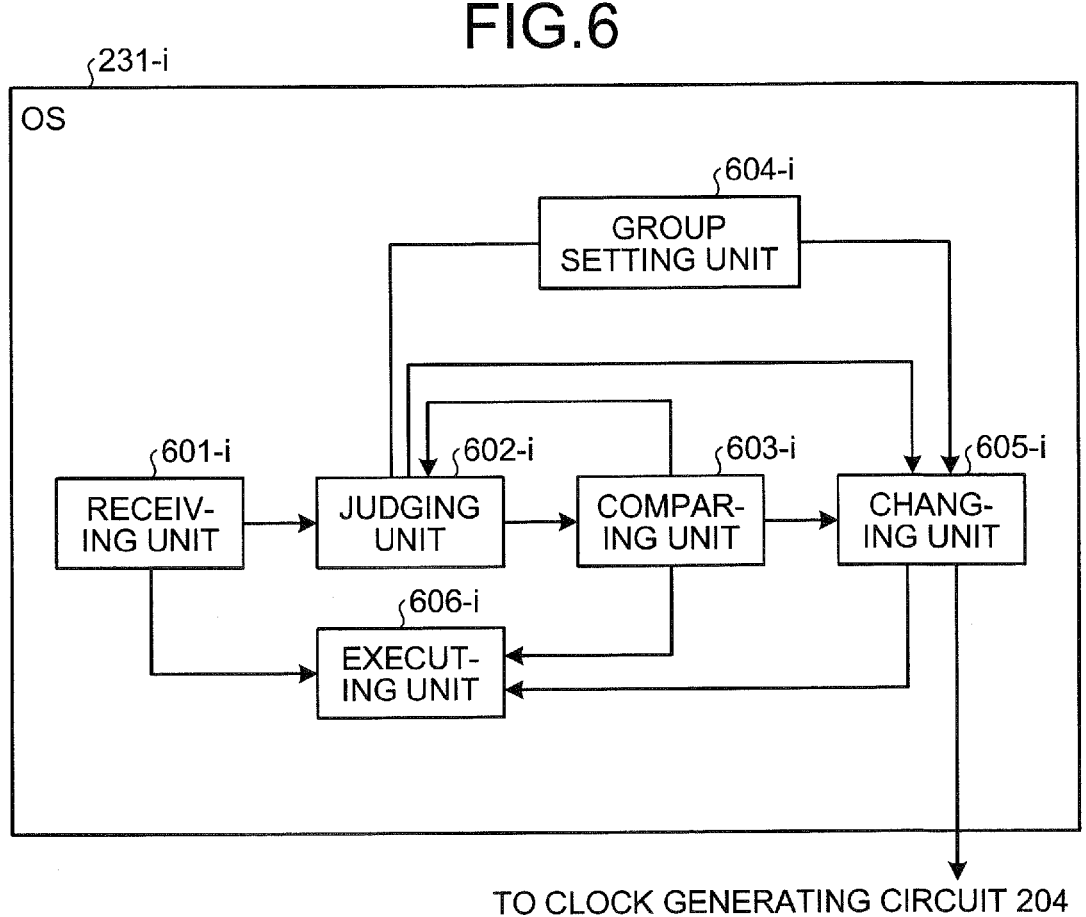
FIG. 6 is a block diagram of a function example of an OS 231-*i*.

A function example of OS 231-$i$ (i=1 to 4) will be described. FIG. 6 is a block diagram of a function example of the OS 231-$i$. The OS 231-$i$ has a receiving unit 601-$i$, a judging unit 602-$i$, a comparing unit 603-$i$, a group setting unit 604-$i$, a changing unit 605-$i$, and an executing unit 606-$i$. The OS 231-$i$ having the receiving unit 601-$i$ to the changing unit 605-$i$ is stored in a storage device such as the flash ROM 211. With the CPU 201-$i$ accessing the storage device to read out the OS 231-$i$ and executing processing encoded within the OS 231-$i$, processing is performed of the receiving unit 601-*i* to the executing unit 606-*i*. Description will be given taking i=1 as an example.

The receiving unit 601-1 receives events. Generation of the thread, dispatch of the thread, switching of the threads, and completion of thread execution are examples of events received by the master OS. The dispatch of the thread, the switching of the threads, and the completion of the thread execution are examples of events received by the slave OS. Description will be given taking an example of the event being the switching of threads.

The receiving unit 601-1 receives the switching of threads and the judging unit 602-1 judges if there is a dependence relationship between the threads whose switching has been received by the receiving unit 601-1 (first thread) and each of the threads under execution by other CPUs.

For example, the judging unit 602-1 detects in the application table 400, the app information having the ID of the first thread in the thread ID field. For example, the judging unit 602-1 identifies the ID of the thread registered in the dependent thread ID field of the detected app information. This identifies the ID of the thread having the dependence relationship with the first thread.

For example, the judging unit 602-1, by an inter-processor communication function, acquires from other OS 231, the ID of the thread under execution. For example, the judging unit 602-1 compares the identified thread ID and the acquired thread ID. By this, it is judged if there is a dependence relationship between the first thread and each of the threads under execution by other CPUs. Results of the judgment are stored in a storage device such as the RAM 209 and the flash ROM 211.

If it is judged by the judging unit 602-1 that the first thread has no dependence relationship with any thread under execution by other CPUs 201, the comparing unit 603-1 compares the access frequency of the secondary cache 203 by the first thread and a first threshold.

For example, the comparing unit 603-1 detects from the application table 400, the app information having the ID of the first thread in the thread ID field. For example, the comparing unit 603-1 identifies the access frequency registered in the access frequency field of the detected app information. For example, the comparing unit 603-1 judges if the identified access frequency is greater than or equal to the first threshold. By this, it is judged if the access frequency of the secondary cache 203 by the first thread is greater than or equal to the first threshold.

If it is judged that the access frequency of the secondary cache 203 by the first thread is greater than or equal to the first threshold, then the comparing unit 603-1 compares the load of the first thread and a second threshold. For example, the comparing unit 603-1 judges if the load of the first thread registered in the load field of the detected app information is greater than or equal to the second threshold.

If it is judged that the load of the first thread is greater than or equal to the second threshold, then the comparing unit 603-1 judges if the multiplication rate of the frequency of the clock to be supplied to the secondary cache 203 is the maximum. For example, the comparing unit 603-1 acquires the value of the control signal RATE from the clock generating circuit 204 and judges if the value of the control signal RATE is the maximum value. The maximum value is 4.

If it is judged by the comparing unit 603-1 that the multiplication rate of the frequency of the clock to be supplied to the secondary cache 203 is not the maximum, then the judging unit 602-1 judges if there is a dependence relationship among the threads under execution by the CPUs excluding the CPU 201-1. For example, the judging unit 602-1 judges if there is a dependence relationship between the thread under execution by the CPU 201-2 and the thread under execution by the CPU 201-3. For example, the judging unit 602-1 judges if there is a dependence relationship between the thread under execution by the CPU 201-2 and the thread under execution by the CPU 201-4. For example, the judging unit 602-1 judges if there is a dependence relationship between the thread under execution by the CPU 201-3 and the thread under execution by the CPU 201-4. With respect to a specific method of judgment, since the processing is the same as the processing of judging the presence or absence of the dependence relationship between the thread under execution by the CPU 201-1 and the thread under execution by each of the CPUs 201-2 to 201-4, detailed description thereof is omitted. Results of the judgment are stored in a storage device such as the RAM 209 and the flash ROM 211.

FIG. 7 is an explanatory diagram of example 1. In FIG. 7, a reference numeral within a circle denotes a thread under execution by the CPU 201 of the corresponding the reference numeral. There is no dependence relationship between the first thread whose switching occurred in the CPU 201-1 and the threads under execution by each of the CPUs 201-2 to 201-4. Therefore, in FIG. 7, an arrowed line is marked by x that connects the first thread whose switching occurred in the CPU 201-1 and the thread under execution by each of the CPUs 201-2 to 201-4.

In FIG. 7, there is no dependence relationship between the thread under execution by the CPU 201-2 and the thread under execution by the CPU 201-3 and there is no dependence relationship between the thread under execution by the CPU 201-2 and the thread under execution by the CPU 201-4. There is no dependence relationship between the thread under execution by the CPU 201-3 and the thread under execution by the CPU 201-4.

The group setting unit 604-1 groups the CPUs, according to the dependence relationship. One group includes one or more CPUs and CPUs that execute threads having a direct or indirect dependence relationship are treated as one group. For example, the group setting unit 604-1 sets each CPU as a different group. The CPU 201-1 belongs to group G1, the CPU 201-2 to group G2, the CPU 201-3 to group G3, and the CPU 201-4 to group G4. The number of CPU groups GC is 4. Results of the grouping setting are stored in a storage device such as the RAM 209 and the flash ROM 211.

The changing unit 605-1 changes the phase of the clock to be supplied to each CPU, according to the results of the grouping setting and changes the frequency of the clock to be supplied to the secondary cache 203, depending on the number of CPU groups GC. For example, the changing unit 605-1 changes the value of the control signal CPUCTRL1 from 0 to "4554". The clock generating circuit 204 detects the change of the control signal CPUCTRL1. The clock generating circuit 204, based on the value of the control signal CPUCTRL1, changes the value of the control signal CTRL2 to "4", the value of the control signal CTRL3 to "5", the value of the control signal CTRL4 to "5", and the value of the control signal RATE to "4".

By this, a clock of a phase shifted by 90 degrees (=360 degrees/GC) from the phase of the clock to be supplied to the CPU 201-1 is supplied to the CPU 201-2. A clock of a phase shifted by 90 degrees from the phase of the clock to be supplied to the CPU 201-2 is supplied to the CPU 201-3. A clock of a phase shifted by 90 degrees from the phase of the clock to be supplied to the CPU 201-3 is supplied to the CPU 201-4. The frequency of the clock CLK-2CM becomes four times as high as the frequency of the clock CLK. After completion of the change by the changing unit 605-1, the executing unit 606-1 executes the first thread. Namely, the clocks to be supplied to the groups become asynchronous among the groups and the frequency of the clock CLK-2CM becomes a frequency that synchronizes with any group.

FIG. 8 is an explanatory diagram of example 2. There is no dependence relationship between the first thread whose switching occurred in the CPU 201-1 and the threads under execution by each of the CPUs 201-2 to 201-4. There is no dependence relationship between the thread under execution by the CPU 201-2 and the thread under execution by the CPU 201-3. There is no dependence relationship between the thread under execution by the CPU 201-2 and the thread under execution by the CPU 201-4. There is a direct dependence relationship between the thread under execution by the CPU 201-3 and the thread under execution by the CPU 201-4. The arrowed line marked by x indicates that there is no dependence relationship between two groups and the arrowed line marked by "o" indicates that there is a dependence relationship between two groups.

The group setting unit 604-1 sets the CPU 201-1 as group G1, the CPU 201-2 as group G2, and the CPUs 201-3 and 201-4 as group G3. The number of CPU groups GC is 3. Results of the grouping setting are stored in a storage device such as the RAM 209 and the flash ROM 211.

The changing unit 605-1 changes the phase of the clock to be supplied to each CPU, based on the number of CPU groups GC and changes the frequency of the clock to be supplied to the secondary cache 203, based on the number of CPU groups GC. For example, the changing unit 605-1 changes the value of the control signal CPUCTRL1 from 0 to "3443". The clock generating circuit 204 detects the change of the control signal CPUCTRL1. The clock generating circuit 204, based on the value of the control signal CPUCTRL1, changes the value of the control signal CTRL2 to "3", the value of the control signal CTRL3 to "4", the value of the control signal CTRL4 to "4", and the value of the control signal RATE to "3".

By this, a clock of a phase shifted by 120 degrees (=360 degrees/number of CPU groups GC=360 degrees/3) from the phase of the clock to be supplied to the CPU 201-1 is supplied to the CPU 201-2. A clock of a phase shifted by 120 degrees from the phase of the clock to be supplied to the CPU 201-2 is supplied to the CPU 201-3. A clock of a phase shifted by 120 degrees from the phase of the clock to be supplied to the CPU 201-2 is supplied to the CPU 201-4. The frequency of the clock CLK-2CM becomes three times as high as the frequency of the clock CLK. After completion of the change by the changing unit 605-1, the executing unit 606-1 executes the first thread.

FIG. 9 is an explanatory diagram of example 3. There is no dependence relationship between the first thread whose switching occurred in the CPU 201-1 and the threads under execution by each of the CPUs 201-2 to 201-4. In FIG. 9, there is a dependence relationship between the thread under execution by the CPU 201-2 and the thread under execution by the CPU 201-3. There is a dependence relationship between the thread under execution by the CPU 201-3 and the thread under execution by the CPU 201-4. While there is no direct dependence relationship between the thread under execution by the CPU 201-2 and the thread under execution by the CPU 201-4, there is an indirect dependence relationship between these threads by way of the CPU 201-3.

The group setting unit 604-1 sets the CPU 201-1 as group G1 and sets the CPUs 201-2, 201-3, and 201-4 as group G2. The number of CPU groups GC is 2.

The changing unit 605-1 changes the phase of the clock to be supplied to each CPU, based on the number of CPU groups GC and changes the frequency of the clock to be supplied to the secondary cache 203, based on the number of CPU groups GC. For example, the changing unit 605-1 changes the value of the control signal CPUCTRL1 from 0 to "2222". The clock generating circuit 204 detects the change of the control signal CPUCTRL1. The clock generating circuit 204, based on the value of the control signal CPUCTRL1, changes the value of the control signal CTRL2 to "2", the value of the control signal CTRL3 to "2", the value of the control signal CTRL4 to "2", and the value of the control signal RATE to "2".

By this, a clock of a phase shifted by 180 degrees (=360 degrees/G) from the phase (inverse) of the clock to be supplied to the CPU 201-1 is supplied to the CPU 201-2. A clock of a phase shifted by 120 degrees from the phase of the clock to be supplied to the CPU 201-2 is supplied to the CPU 201-3. A clock of a phase that is the inverse of the phase of the clock to be supplied to the CPU 201-2 is supplied to the CPU 201-4. The frequency of the clock CLK-2CM becomes two times as high as the frequency of the clock CLK. After completion of the change by the changing unit 605-1, the executing unit 606-1 executes the first thread.

If it is judged by the judging unit 602-1 that there is a dependence relationship between the first thread whose switching was received by the receiving unit 601-1 and each of the threads under execution by other CPUs, then the judging unit 602-1 judges if there is a dependence relationship among the threads under execution by all CPUs.

FIG. 10 is an explanatory diagram of example 4. There is a direct dependence relationship between the first thread whose switching occurred at the CPU 201-1 and the thread under execution by the CPU 201-2. There is a direct dependence relationship between the thread under execution by the CPU 201-2 and the thread under execution by the CPU 201-3. There is a direct dependence relationship between the thread under execution by the CPU 201-3 and the thread under execution by the CPU 201-4.

While there is no direct dependence relationship between the first thread whose switching occurred at the CPU 201-1 and the thread under execution by the CPU 201-3, there is an indirect dependence relationship between these two threads by way of the thread under execution by the CPU 201-2. While there is no direct dependence relationship between the first thread whose switching occurred in the CPU 201-1 and the thread under execution by the CPU 201-4, there is an indirect dependence relationship between these two threads by way of the thread under execution by the CPU 201-2 and the thread under execution by the CPU 201-3.

For example, the group setting unit 604-1 sets the CPUs 201-1 to 201-4 as group G1. The number of CPU groups is 1. Results of the grouping setting are stored in a storage device such as the RAM 209 and the flash ROM 211.

The changing unit 605-1 changes the phase of the clock to be supplied to each CPU, based on the number of CPU groups GC and changes the frequency of the clock to be supplied to the secondary cache 203, based on the number of CPU groups GC. For example, the changing unit 605-1 changes the value of the control signal CPUCTRL1 from 0 to "1111". The clock generating circuit 204 detects the change of the control signal CPUCTRL1. The clock generating circuit 204, based on the value of the control signal CPUCTRL1, changes the value of the control signal CTRL2 to "1", the value of the control signal CTRL3 to "1", the value of the control signal CTRL4 to "1", and the value of the control signal RATE to "1".

By this, a clock of the same phase as that of the clock CLK is supplied to each CPU. The frequency of the clock CLK-2CM becomes the same as that of the clock CLK. After completion of the change by the changing unit 605-1, the executing unit 606-1 executes the first thread.

Figure 11:
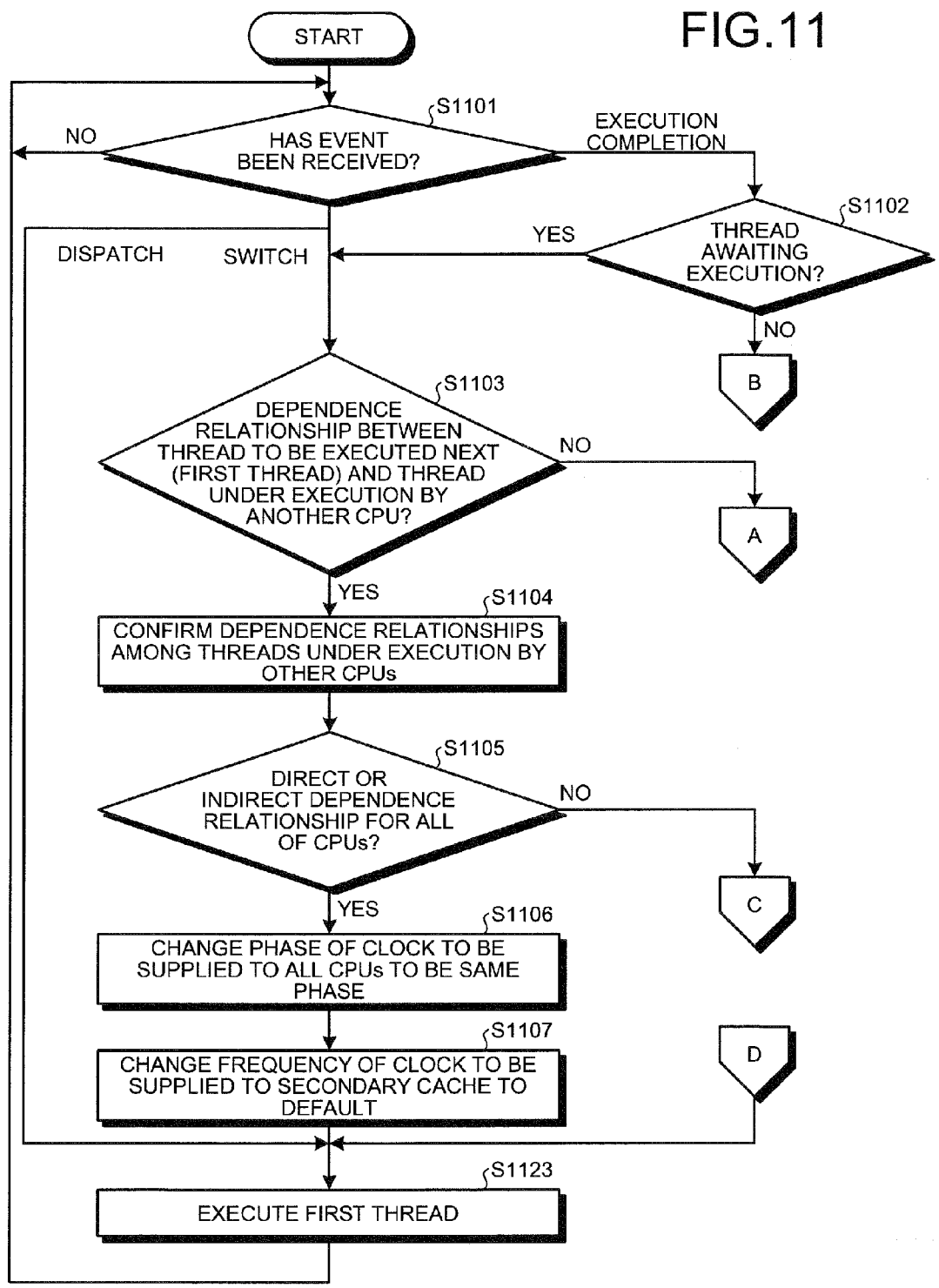
FIGS. 11 and 12 are a flowchart of an example of thread processing by the OS 231-*i*.
Figure 12:
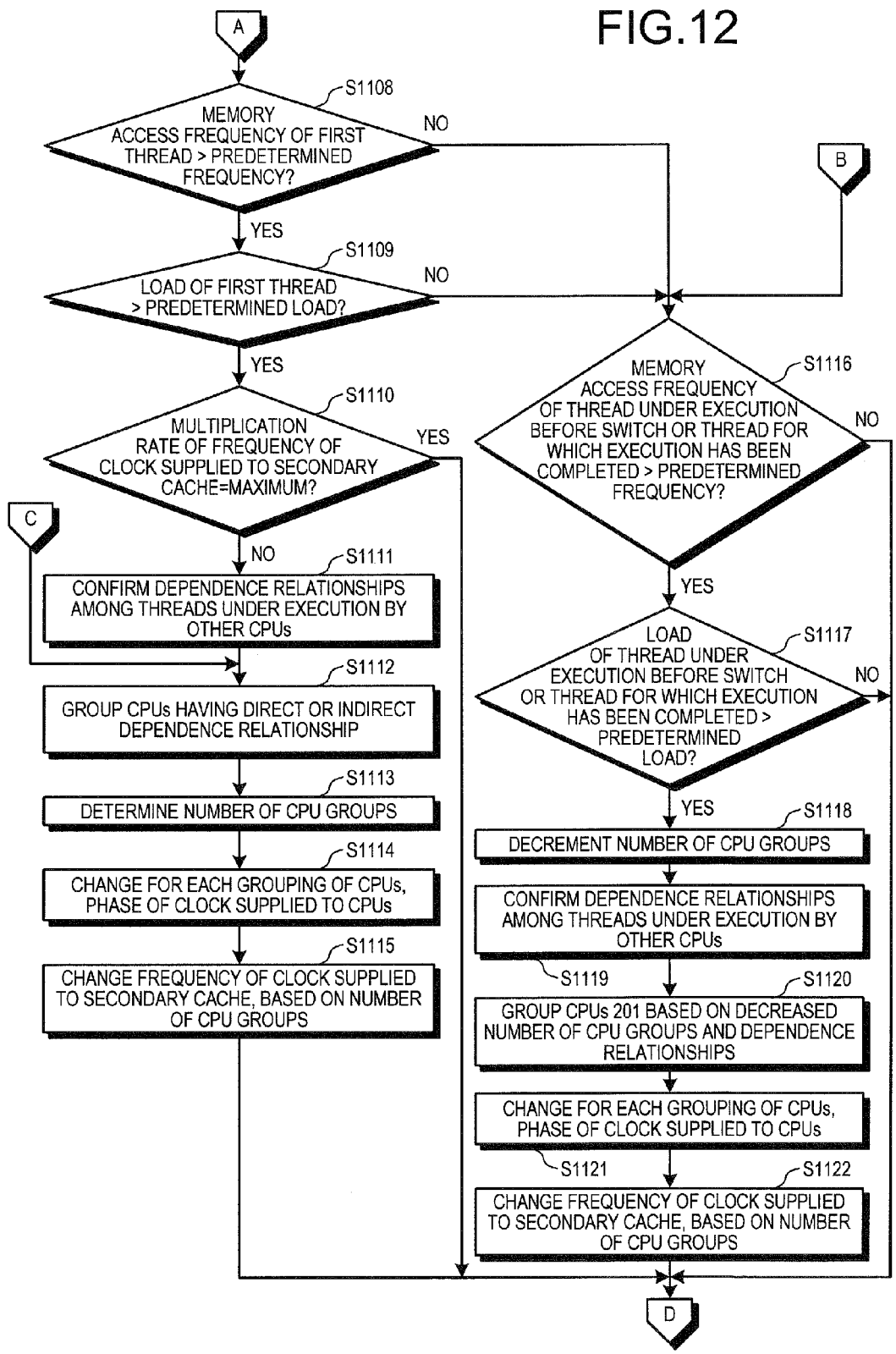

FIGS. 11 and 12 are a flowchart of an example of thread processing by the OS 231-*i*. The OS 231-*i* judges if the occurrence of an event has been received by the receiving unit 601-*i* (step S1101). If it is judged that the occurrence of the event has not been received (step S1101: NO), then the OS 231-*i* returns to step S1101. If the dispatch has been received (step S1101: DISPATCH), then the OS 231-*i* proceeds to step S1123.

If it is judged that a completion of thread execution has been received (step S1101: EXECUTION COMPLETION), then the OS 231-*i* judges if there is a thread awaiting execution (step S1102). Whether there is a thread awaiting execution is judged by whether a pointer of context information is registered in the run queue 241-*i*. If it is judged that there is no thread awaiting execution (step S1102: NO), then the OS 231-*i* proceeds to step S1116. If it is judged that there is a thread awaiting execution (step S1102: YES), then the OS 231-*i* proceeds to step S1103.

At step S1101, if it is judged that a switching of threads has been received (step S1101: SWITCH), then the OS 231-*i* proceeds to step S1103. Following a "SWITCH" at step S1101 or "YES" at step S1102, the OS 231-*i*, via the judging unit 602-*i*, judges if there is a dependence relationship between the thread to be executed next (first thread) and the thread under execution by another CPU (step S1103). The thread to be executed next is the thread to be executed consequent to the switching, in the case of a switching of threads, and is the thread for which the pointer of the context information is registered at the head of the run queue 241-*i*, in the case of a completion of thread execution.

If it is judged that there is a dependence relationship between the first thread and the thread under execution by another CPU (step S1103: YES), then the OS231-*i* confirms dependence relationships among the threads under execution by the other CPUs (step S1104). The OS 231-*i* judges if there is a direct or indirect dependence relationship for all of the CPUs (step S1105). If it is judged that there is a dependence relationship among all CPUs (step S1105: YES), then the OS 231-*i* changes the phase of the clock to be supplied to all of the CPUs to be the same phase (step S1106). The OS 231-*i* changes the frequency of the clock to be supplied to the secondary cache 203 to the default (step S1107) and proceeds to step S1123.

At step S1105, if it is judged that there is no dependence relationship among all the CPUs (step S1105: NO), then the OS 231-*i* proceeds to step S1112. At step S1103, if it is judged that there is no dependence relationship between the first thread and the thread under execution by another CPU (step S1103: NO), then the OS 231-*i* judges if the memory access frequency of the first thread is greater than a predetermined frequency (step S1108). The predetermined threshold is the first threshold. If it is judged that the memory access frequency of the first thread is not greater than the predetermined frequency (step S1108: NO), then the OS 231-*i* proceeds to step S1116. If it is judged that the memory access frequency of the first thread is greater than the predetermined frequency (step S1108: YES), then the OS 231-*i* judges if the load of the first thread is greater than a predetermined load (step S1109). The predetermined load is the second threshold.

If it is judged that the load of the first thread is not greater than the predetermined load (step S1109: NO), then the OS231-*i* proceeds to step S1116. If it is judged that the load of the first thread is greater than the predetermined load (step S1109: YES), then the OS 231-*i* judges if the multiplication rate of the frequency of the clock to be supplied to the secondary cache 203 is the maximum (step S1110). If it is judged that the multiplication rate of the frequency of the clock to be supplied to the secondary cache 203 is the maximum (step S1110: YES), then OS 231-*i* proceeds to step S1123. If it is judged that the multiplication rate of the frequency of the clock to be supplied to the secondary cache 203 is not the maximum (step S1110: NO), then OS 231-*i*, via the judging unit 602-*i*, confirms dependence relationships among the threads under execution by the other CPUs (step S1111).

The OS 231-*i* groups the CPUs having a direct or indirect dependence relationship (step S1112) and determines the number of CPU groups GC (step S1113). The OS 231-*i* changes for each grouping of the CPUs, the phase of the clock to be supplied to the CPUs (step S1114), changes the frequency of the clock to be supplied to the secondary cache 203, based on the number of CPU groups GC (step S1115), and proceeds to step S1123.

Following "NO" at step S1102, "NO" at step S1108, or "NO" at step S1109, the OS 231-*i*, via the comparing unit 603-*i*, judges if the memory access frequency of any one among the thread under execution before the switch or the thread for which execution has been completed is greater than the predetermined frequency (step S1116). If it is judged that the memory access frequency of neither the thread under execution before the switch or the thread for which execution has been completed is not greater than the predetermined frequency (step S1116: NO), then the OS 231-*i* proceeds to step S1123. If it is judged that the memory access frequency of the thread under execution before the switch or the thread for which execution has been completed is greater than the predetermined frequency (step S1116: YES), then the OS 231-*i* proceeds to step S1117.

The OS 231-*i* judges if the load of the thread under execution before the switch or the thread for which execution has been completed is greater than the predetermined load (step S1117). If it is judged that the load of the thread under execution before the switch or the thread for which execution has been completed is not greater than the predetermined load (step S1117: NO), then the OS 231-*i* proceeds to step S1123.

If it is judged that the load of the thread under execution before the switch or the thread for which execution has been complete is greater than the predetermined load (step S1117: YES), then the OS 231-*i* decrements the number of CPU groups GC (step S1118). The OS 231-*i* confirms dependence relationships among the threads under execution by the other CPUs (step S1119) and groups the CPUs 201 based on the decreased number of CPU groups GC and the dependence relationships (step S1120). For example, configuration may be such that a number of groups that is equal to the number of the CPU groups GC are prepared so that the number of CPUs per group will be equal, based on the dependence relationships.

The OS 231-*i* changes for each grouping of the CPUs, the phase of the clock to be supplied to the CPUs (step S1121). The OS 231-*i* changes based on the number of CPU groups GC, the frequency of the clock to be supplied to the secondary cache 203 (step S1122) and proceeds to step S1123. The OS 231-*i*, via the executing unit 606-*i*, executes the first thread (step S1123) and returns to step S1101. Step S1123 is executed following DISPATCH at step S1101, step S1107, "YES" at step S1110, step S1115, "NO" at step S1116, "NO" at step S1117, or step S1122.

Figure 13:
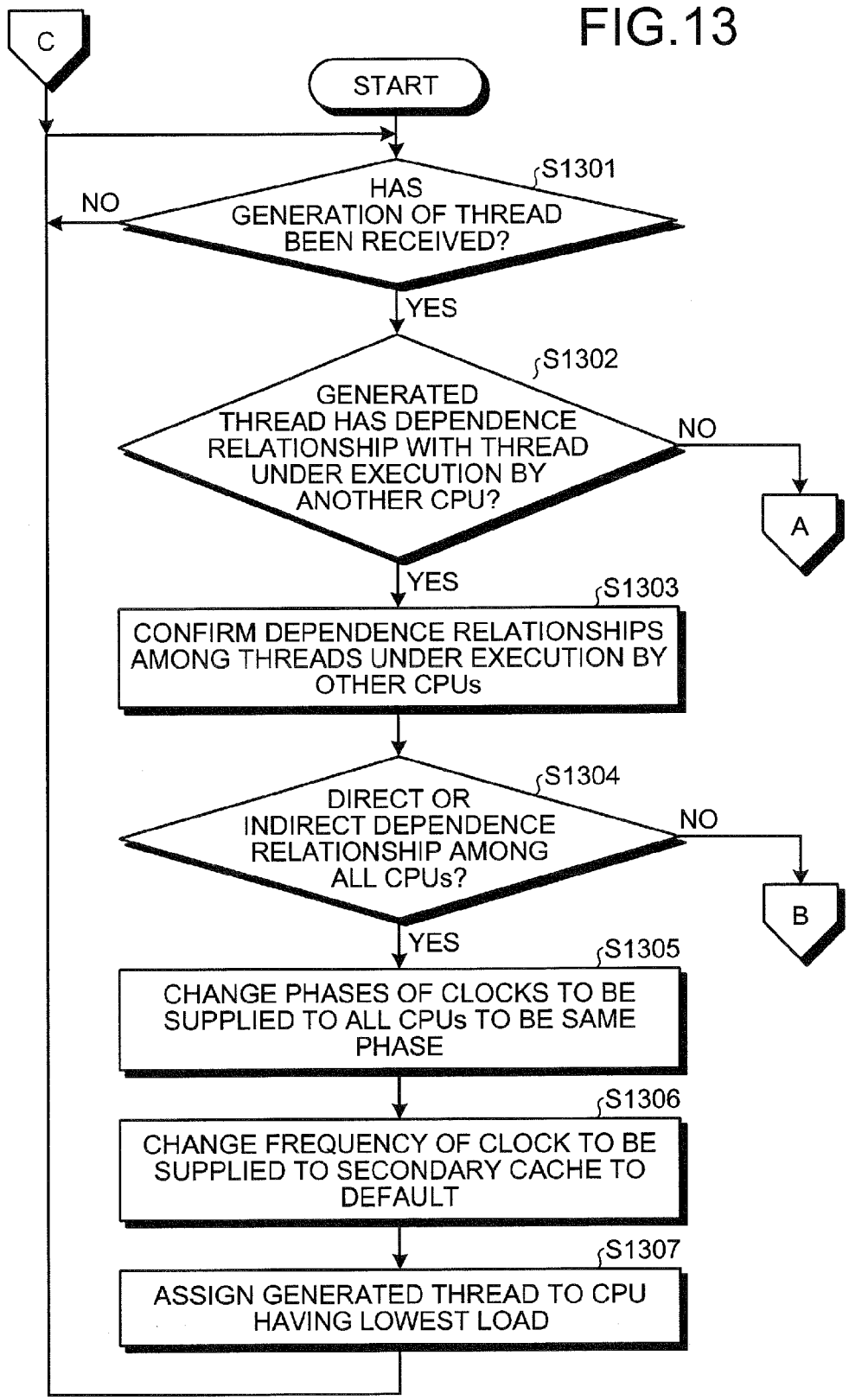
FIGS. 13 and 14 are a flowchart of an example of the thread processing by the OS 231-1.
Figure 14:
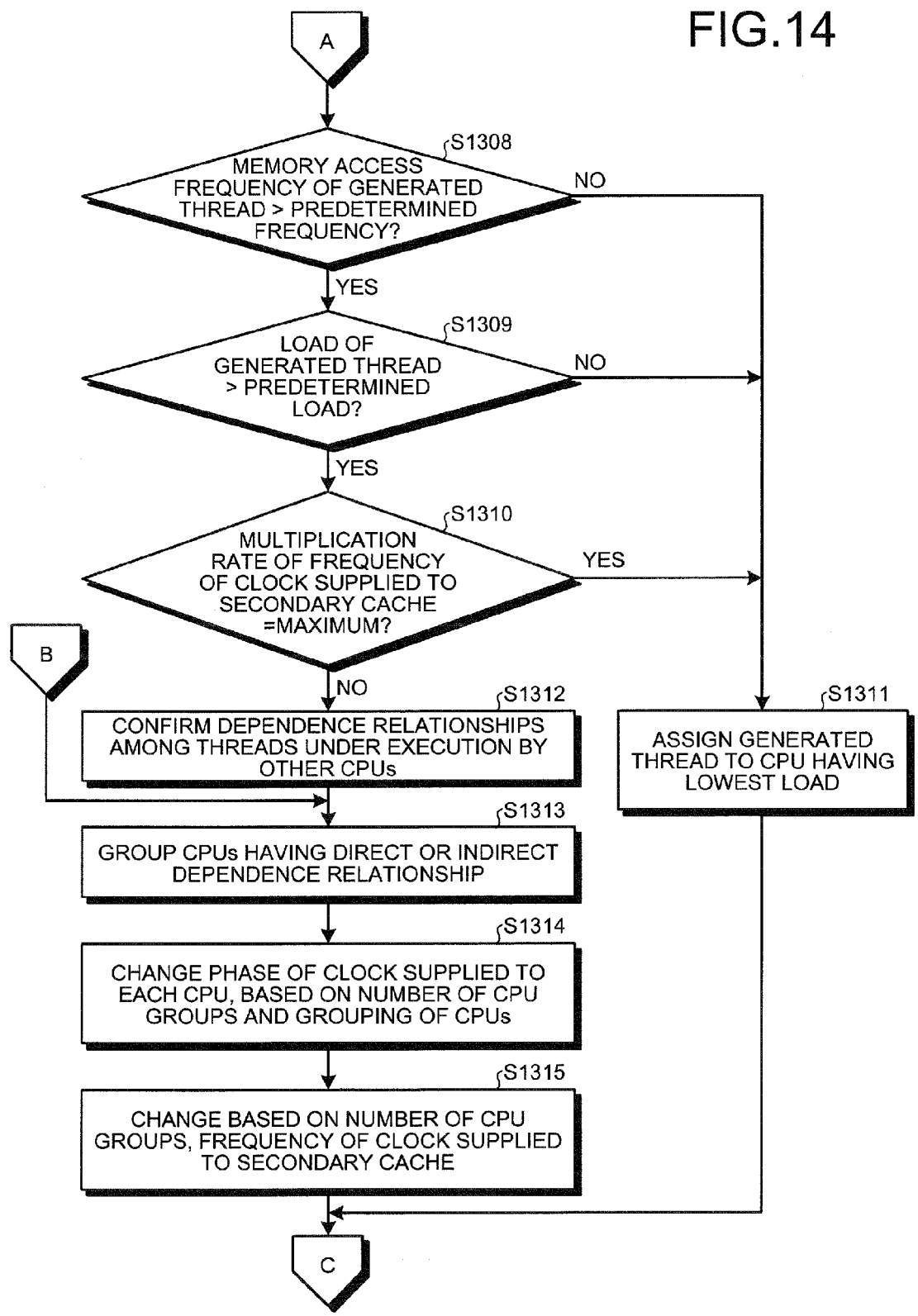

FIGS. 13 and 14 are a flowchart of an example of the thread processing by the OS 231-1. The OS 231-1 judges if a generation of a thread has been received by the receiving unit 601-1 (step S1301). If it is judged that a generation of a thread has not been received (step S1301: NO), then the OS 231-1 returns to step S1301.

If it is judged that a generation of a thread has been received (step S1301: YES), then the OS 231-1 judges if the generated thread has a dependence relationship with a thread under execution by another CPU (step S1302). If it is judged that the generated thread has a dependence relationship with a thread under execution by another CPU (step S1302: YES), then the OS 231-1 confirms dependence relationships among the threads under execution by the other CPUs (step S1303). The OS 231-1 judges if there is a direct or indirect dependence relationship among all CPUs (step S1304). If it is judged that there is no direct or indirect dependence relationship among all CPUs (step S1304: NO), then the OS 231-1 proceeds to step S1313.

If it is judged that there is a direct or indirect dependence relationship among all CPUs (step S1304: YES), then the OS 231-1 changes the phases of the clocks to be supplied to all CPUs to be the same phase (step S1305). The OS 231-1 changes the frequency of the clock to be supplied to the secondary cache 203 to the default (step S1306), assigns the generated thread to the CPU having the lowest load (step S1307), and returns to step S1301. With respect to the CPU having the lowest load, the OS 231-1 firstly identifies the thread assigned to each CPU, using the assignment table 500. The OS 231-1, referring to the application table 400, searches for the load of the identified thread. The OS 231-1 calculates a total value of the loads searched-for of the threads assigned to each CPU and identifies the CPU having the lowest total value as the CPU having the lowest load.

If it is judged that the generated thread has no dependence relationship with a thread under execution by another CPU (step S1302: NO), then the OS 231-1 judges if the memory access frequency of the generated thread is greater than the predetermined frequency (step S1308). If it is judged that the memory access frequency of the generated thread is not greater than the predetermined frequency (step S1308: NO), then the OS 231-1 proceeds to step S1311.

If it is judged that the memory access frequency of the generated thread is greater than the predetermined frequency (step S1308: YES), then the OS 231-1 judges if the load of the generated thread is greater than the predetermined load (step S1309). If it is judged that the load of the generated thread is not greater than the predetermined load (step S1309: NO), then the OS 231-1 proceeds to step S1311.

If it is judged that the load of the generated thread is greater than the predetermined load (step S1309: YES), then the OS 231-1 judges if the multiplication rate of the frequency of the clock to be supplied to the secondary cache 203 is the maximum (step S1310). If it is judged that the multiplication rate of the frequency of the clock to be supplied to the secondary cache 203 is the maximum (step S1310: YES), then the OS 231-1 proceeds to step S1311. Following "NO" at step S1308, "NO" at step S1309, or "YES" at step S1310, the OS 231-1 assigns the generated thread to the CPU having the lowest load (step S1311) and returns to step S1301.

At step S1310, if it is judged that the multiplication rate of the frequency of the clock to be supplied to the secondary cache 203 is not the maximum (step S1310: NO), then the OS 231-1 confirms dependence relationships among the threads under execution by the other CPUs (step S1312). The OS 231-1 groups the CPUs having a direct or indirect dependence relationship (step S1313) and changes the phase of the clock to be supplied to each CPU, based on the number of CPU groups GC and the grouping of the CPUs (step S1314). The OS 231-1 changes the frequency of the clock to be supplied to the secondary cache 203, based on the number of CPU groups GC (step S1315) and returns to step S1301.

FIG. 15 is a flowchart of an example of a changing process by the clock generating circuit 204. Firstly, the clock generating circuit 204 judges if a control command has been received from a CPU (step S1501). The control command is, for example, the change of a control signal among the control signals CPUCTRL1 to CPUCTRL4 from "0000" to a different value.

If it is judged that a control command has been received from a CPU (step S1501: YES), then the clock generating circuit 204 changes the control signal (step S1502) and returns to step S1501. The control signal is, for example, the control signals CTRL1 to CTRL4 and the control signal RATE. If it is judged that no control command has been received from a CPU (step S1501: NO), then the clock generating circuit 204 returns to step S1501.

As described above, according to the thread processing method and the thread processing system, it is judged if there is a dependence relationship between the first thread to be executed in the first CPU and the second thread to be executed in the second CPU. If there is no dependence relationship between the first thread and the second thread and if the frequency of access of the shared resources by the first thread is greater than or equal to the predetermined frequency, then the phase of the clock to be supplied to the first CPU is changed to a phase different from that of the clock to be supplied to the second CPU.

The higher that the access frequency of the first thread becomes, the higher the possibility becomes that the access of the shared resources by the first thread can collide with the access of the shared resources by the second thread. For this reason, the difference in the phase of the clock to be supplied to each CPU can reduce access collisions at the shared resources by plural CPUs. The difference in the phase of the clock to be supplied to the CPU can reduce the peak current.

With a change made so that the phase of the clock to be supplied to the first CPU and the phase of the clock to be supplied to the second CPU will be opposite to each other, access collisions at the shared resources by the plural CPUs can be reduced.

The change of the phase of the clock to be supplied to the first CPU, coupled with a raising of the frequency of the clock to be supplied to the shared resources instead of the raising of the frequency of the clock to be supplied to plural CPUs, can reduce access collision at the shared resources by the plural CPUs while suppressing power consumption and can enhance the performance of the multi-core processor system.

The frequency of the clock to be supplied to the shared resources is changed to a frequency twice as high as that of the clock to be supplied to the first CPU. Access collisions at the shared resources by plural CPUs can be reduced and a waiting time that is caused by a concentration of the accesses of the shared resources by the plural CPUs can be decreased.

The load at the time of execution of the first thread is compared with the second threshold and if the load is greater than the second threshold, then a dependence relationship is determined. The greater the load of the first thread becomes, the higher the possibility becomes that the access of the shared resources by the first thread will collide with the access of the shared resources by the second thread. For this reason, different phases of the clocks to be supplied to the CPUs can reduce access collisions at the shared resources by plural CPUs and can minimize power consumption.

If there is a dependence relationship between the first thread and the second thread, the phase of the clock to be supplied to the first CPU is not changed. This can prevent the data shared by the first and the second threads and exclusive control from being affected.

When no dependence relationship exists and the phase of a first operation clock has been changed from a first phase to a second phase, the phase of the first operation clock is changed from the second phase to the first phase. This can reduce access collisions at the shared resources by plural CPUs.

Dependence relationships are registered in the shared memory or a first processor, enabling easy determination of a dependence relationship between the first thread and the second thread and shortening the processing time.

The CPUs that execute threads having dependence relationships are grouped. When there are plural groupings of the CPUs, the phase of the clock to be supplied to each grouping of CPUs is set to a phase such that the clocks become asynchronous among different groupings of CPUs. The frequency of the clock to be supplied to the shared resources is set to a frequency that synchronizes with any grouping of the CPUs, enabling reductions in access collisions and thereby, improving the performance of the multi-core processor even if the number of CPUs of the multi-core processor is increased.

The thread processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the recording medium, and executed by the computer. The program may be distributed through a network such as the Internet.

One aspect of the embodiments enables access collisions at shared resources to be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A thread processing method that is executed by a multi-core processor, the thread processing method comprising:
    supplying a command to execute a first thread to a first processor;
    judging a dependence relationship between the first thread and a second thread to be executed by a second processor;
    comparing a first threshold and a frequency of access of any one among shared memory and shared cache memory by the first thread; and
    changing a phase of a first operation clock of the first processor when the access frequency is greater than the first threshold and upon judging that no dependence relationship exists between the first thread and the second thread.

2. The thread processing method according to claim 1, wherein
    the changing of the phase of the first operation clock includes changing the phase to a phase opposite to that of a second operation clock of the second processor.

3. The thread processing method according to claim 1, further comprising
    changing a frequency of a second operation clock to be supplied to any one among the shared memory and the shared cache memory, when changing the phase of the first operation clock.

4. The thread processing method according to claim 3, further comprising
    doubling the frequency of the second operation clock.

5. The thread processing method according to claim 1, and further comprising
    comparing a first load at a time of execution of the first thread and a second threshold, wherein
    the changing of the phase of the first operation clock of the first processor includes changing the phase when the first load is greater than the second threshold, the access frequency is greater than the first threshold, and no dependence relationship exists.

6. The thread processing method according to claim 1, wherein
    the changing the phase of the first operation clock includes not changing the phase of the first operation clock when a dependence relationship exists.

7. The thread processing method according to claim 1, wherein
    the changing the phase of the first operation clock includes changing the phase of the first operation clock from a second phase to a first phase, when the phase of the first operation clock has been changed from the first phase to the second phase and no dependence relationship exists.

8. The thread processing method according to claim 1, wherein
    the dependence relationship is registered in any one among the shared memory and memory of the first processor.

9. A thread processing system comprising:
    a first processor;
    any one among shared memory and shared cache memory that is accessible by the first processor and a second processor; and
    a clock control unit that controls a first operation clock to be supplied to the first processor and a second operation clock to be supplied to the shared memory, wherein
    the clock control unit changes a phase of a first operation clock of the first processor, based on a result of comparison of a first threshold and an access frequency of any one among the shared memory and the shared cache memory by a first thread that is to be executed by the first processor and further based on a dependence relationship between the first thread and a second thread that is to be executed by the second processor,
    wherein the clock control unit changes the phase of the first operation clock when the result of the comparison indicates that the access frequency is greater than the first threshold and when no dependence relationship exists between the first thread and the second thread.

10. The thread processing system according to claim 9, wherein
the clock control unit changes the phase of the first operation clock of the first processor, based on a result of comparison of a second threshold and a first load at a time of execution of the first thread by the first processor.

11. The thread processing system according to claim 9, wherein
the clock control unit changes the phase of the first operation clock to a phase opposite to that of a second operation clock of the second processor.

12. The thread processing system according to claim 9, wherein
the clock control unit changes a frequency of the second operation clock when changing the phase of the first operation clock.

13. The thread processing system according to claim 12, wherein
the clock control unit doubles the frequency of the operation clock.

* * * * *